(12) United States Patent
Toyama et al.

(10) Patent No.: US 11,124,294 B2
(45) Date of Patent: Sep. 21, 2021

(54) AIRCRAFT

(71) Applicant: Panasonic Intellectual Property Management Co., Ltd., Osaka (JP)

(72) Inventors: Masayuki Toyama, Kanagawa (JP); Naoto Yumiki, Osaka (JP); Atsuhiro Tsuji, Osaka (JP); Hiroyuki Matsumoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 235 days.

(21) Appl. No.: 16/118,915

(22) Filed: Aug. 31, 2018

(65) Prior Publication Data
US 2019/0009893 A1    Jan. 10, 2019

Related U.S. Application Data

(63) Continuation of application No. PCT/JP2017/003528, filed on Feb. 1, 2017.

(30) Foreign Application Priority Data

Mar. 10, 2016    (JP) .............................. JP2016-047529

(51) Int. Cl.
*B64C 39/02*        (2006.01)
*B64C 27/00*        (2006.01)
(Continued)

(52) U.S. Cl.
CPC .............. *B64C 27/006* (2013.01); *B64B 1/02* (2013.01); *B64B 1/58* (2013.01); *B64C 13/16* (2013.01);
(Continued)

(58) Field of Classification Search
CPC ......... B64C 13/20; B64C 27/08; B64C 39/00; B64C 2201/101; B64C 2201/108;
(Continued)

(56) References Cited

U.S. PATENT DOCUMENTS 5,071,383 A    12/1991 Kinoshita
2007/0102570 A1*    5/2007 Luffman .................. B64B 1/22
244/30
(Continued)

FOREIGN PATENT DOCUMENTS

JP    S53-102599 A    9/1978
JP    H04-022386 A    1/1992
(Continued)

OTHER PUBLICATIONS

Office Action issued in corresponding Japanese Patent Aoplication No. 2018-504051, dated Jun. 11, 2019.
(Continued)

*Primary Examiner* — Brian M O'Hara
*Assistant Examiner* — Keith L Dixon
(74) *Attorney, Agent, or Firm* — McDermott Will & Emery LLP

(57) ABSTRACT

An aircraft includes; a plurality of rotor units each of which includes a propeller and a motor which drives the propeller, and generates thrust for flight of the aircraft; a controller which controls rotation of the propellers included in the plurality of rotor units; a balloon which laterally covers the plurality of rotor units; and a detector which detects a state of the aircraft, wherein the controller decreases a rotational speed of the propeller included in at least one rotor unit among the plurality of rotor units, according to a result of detection by the detector.

10 Claims, 12 Drawing Sheets

(51) Int. Cl.
  *B64C 27/08* (2006.01)
  *B64C 13/16* (2006.01)
  *B64D 45/00* (2006.01)
  *B64B 1/02* (2006.01)
  *B64B 1/58* (2006.01)
  *B64C 27/20* (2006.01)
  *B64D 31/06* (2006.01)

(52) U.S. Cl.
  CPC .............. *B64C 27/08* (2013.01); *B64C 27/20* (2013.01); *B64C 39/02* (2013.01); *B64C 39/024* (2013.01); *B64D 31/06* (2013.01); *B64D 45/00* (2013.01); *B64C 2201/022* (2013.01); *B64C 2201/024* (2013.01); *B64C 2201/042* (2013.01); *B64C 2201/101* (2013.01); *B64C 2201/108* (2013.01); *B64C 2201/127* (2013.01); *B64C 2201/146* (2013.01)

(58) Field of Classification Search
  CPC ........ B64C 2201/022; B64C 2201/027; B64B 1/30; B64B 1/34; B64B 1/32; B64D 25/00
  See application file for complete search history.

(56) References Cited

U.S. PATENT DOCUMENTS

| | | | | |
|---|---|---|---|---|
| 2008/0011900 A1* | 1/2008 | Quintana | .............. | B64C 11/006 244/30 |
| 2009/0072082 A1* | 3/2009 | Arel | .......................... | B64B 1/30 244/66 |
| 2012/0234969 A1* | 9/2012 | Savoye | .................. | A63H 27/12 244/17.13 |
| 2014/0158823 A1* | 6/2014 | Smith | ....................... | B64B 1/44 244/1 A |
| 2015/0291269 A1* | 10/2015 | Goelet | ...................... | B64B 1/58 244/30 |
| 2017/0274995 A1* | 9/2017 | Yamada | .................... | B64F 3/02 |
| 2018/0022461 A1* | 1/2018 | Nunes | .................. | B64C 39/024 244/26 |
| 2018/0147429 A1* | 5/2018 | Won | ........................ | B60F 5/02 |
| 2019/0002075 A1* | 1/2019 | Toyama | ................. | B64D 25/00 |
| 2019/0002093 A1* | 1/2019 | Muramatsu | ........... | B64C 39/024 |
| 2019/0291858 A1* | 9/2019 | Li | ......................... | B64C 39/024 |

FOREIGN PATENT DOCUMENTS

| | | |
|---|---|---|
| JP | 2006-082774 A | 3/2006 |
| JP | 2011-046355 A | 3/2011 |
| JP | 2014-227155 A | 12/2014 |
| JP | 2015-117003 A | 6/2015 |
| JP | 6037190 B1 * | 12/2016 ............. B64D 47/04 |

OTHER PUBLICATIONS

International Search Report issued in Application No. PCT/JP2017/003528 dated Mar. 14, 2017, with English translation.

\* cited by examiner

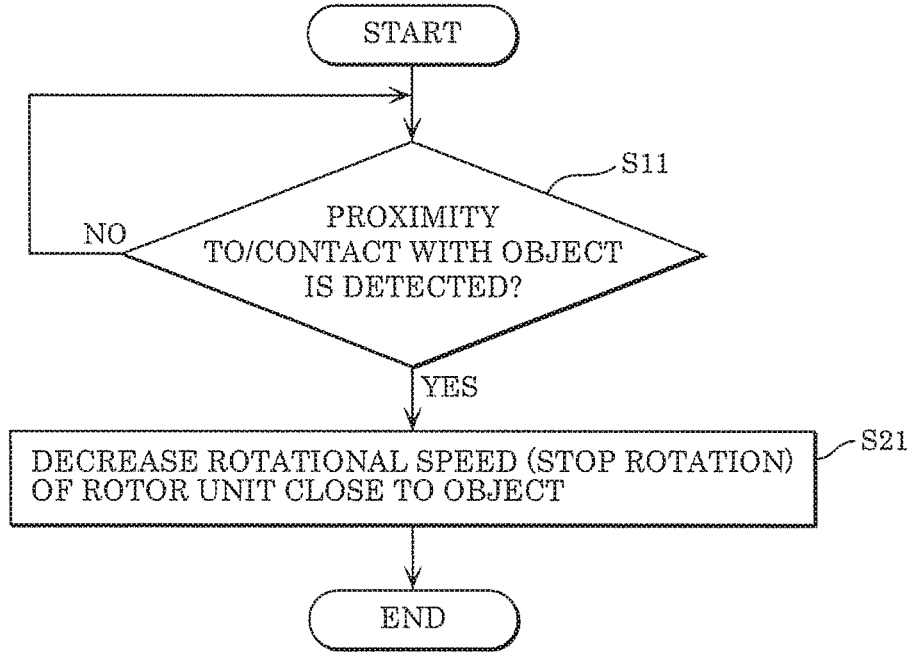
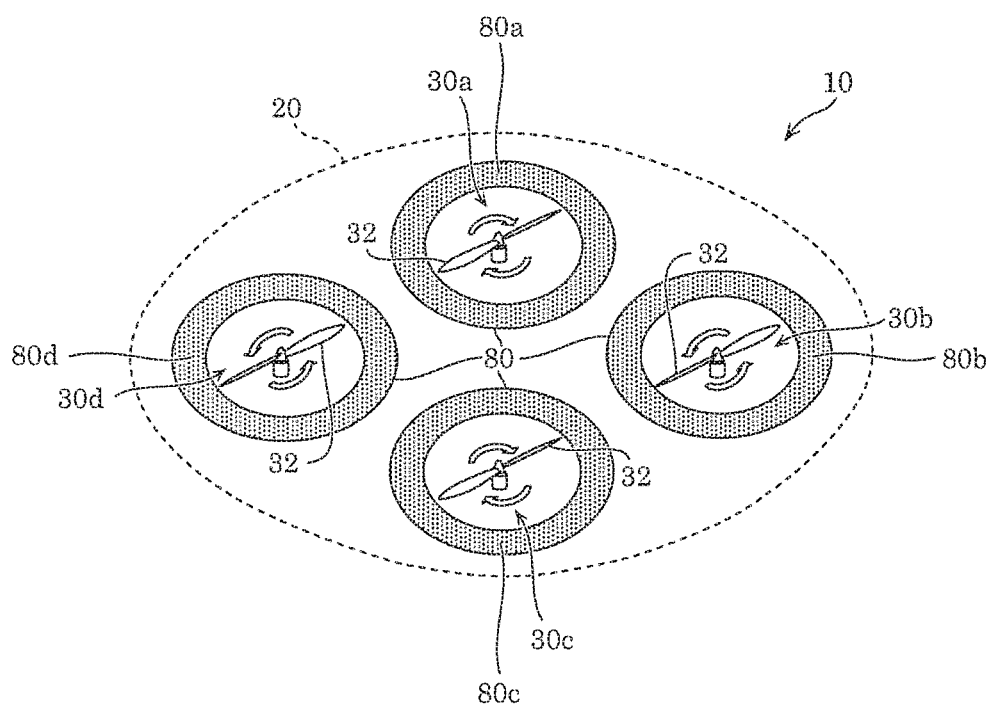

AIRCRAFT

CROSS REFERENCE TO RELATED APPLICATIONS

This application is a U.S. continuation application of PCT International Patent. Application Number PCT/JP2017/003528 filed on Feb. 1, 2017, claiming the benefit of priority of Japanese Patent Application Number 2016-047529 filed on Mar. 10, 2016, the entire contents of which are hereby incorporated by reference.

BACKGROUND

1. Technical Field

The present disclosure relates to an aircraft which includes a plurality of rotor units.

2. Description of the Related. Art

Japanese Unexamined Patent Application. Publication No. 2011-046355 discloses an aircraft which includes a plurality of rotor units each including a propeller. This type of aircraft is referred to as a multicopter or a drone, for example.

Japanese Unexamined Patent Application Publication No. H04-022386 discloses an aircraft which includes: a single rotor unit which includes a propeller; and a buoyant body filled with helium gas. The buoyant body of the aircraft disclosed in the publication is donut shaped, and surrounds the single rotor unit.

SUMMARY

The plurality of rotor units are exposed from the aircraft disclosed in Japanese Unexamined Patent Application Publication No. 2011-046355. The aircraft disclosed in Japanese Unexamined Patent Application Publication No. H04-022386 includes a single rotor unit which includes a large propeller in a center portion of the buoyant body. Accordingly, if an aircraft like the above contacts an object during the flight, the object may be damaged by the propeller driven to rotate in the rotor unit to generate thrust.

The present disclosure has been conceived in view of this point, and provides an aircraft which flies using a plurality of rotor units, and safety of which has improved.

An aircraft according to the present disclosure includes: a plurality of rotor units each of which includes a propeller and a motor which drives the propeller, and generates thrust for flight of the aircraft; a controller which controls rotation of the propellers included in the plurality of rotor units; a shock absorber which laterally covers the plurality of rotor units; and a detector which detects a state of the aircraft, wherein the controller decreases a rotational speed of the propeller included in at least one rotor unit among the plurality of rotor units, according to a result of detection by the detector.

According to the aircraft according to the present disclosure, a plurality of rotor units enable flight and furthermore, safety improves.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 9 is a flowchart illustrating a first specific example of controlling operation according to a state of the aircraft, in the aircraft according to the embodiment;

FIG. 10 illustrates correspondences between a plurality of rotor units and sensors included in a detector;

DETAILED DESCRIPTION OF THE EMBODIMENTS

The following describes embodiments in detail, with reference to the drawings when necessary. Note that an unnecessarily detailed description may be omitted. For example, a detailed description of a matter already known well and a redundant description of substantially the same configuration may be omitted. This is intended to avoid the following description being unnecessarily redundant, and to facilitate the understanding of those skilled in the art.

Note that the inventors have provided the accompanying drawings and the following description, in order to help persons skilled in the art to sufficiently understand the present disclosure, and thus do not intend to limit the disclosed subject matter of the claims by the drawings and the description.

Embodiment

[Schematic Configuration of Aircraft]

Aircraft 10 according to an embodiment is to be described.

Figure 1:
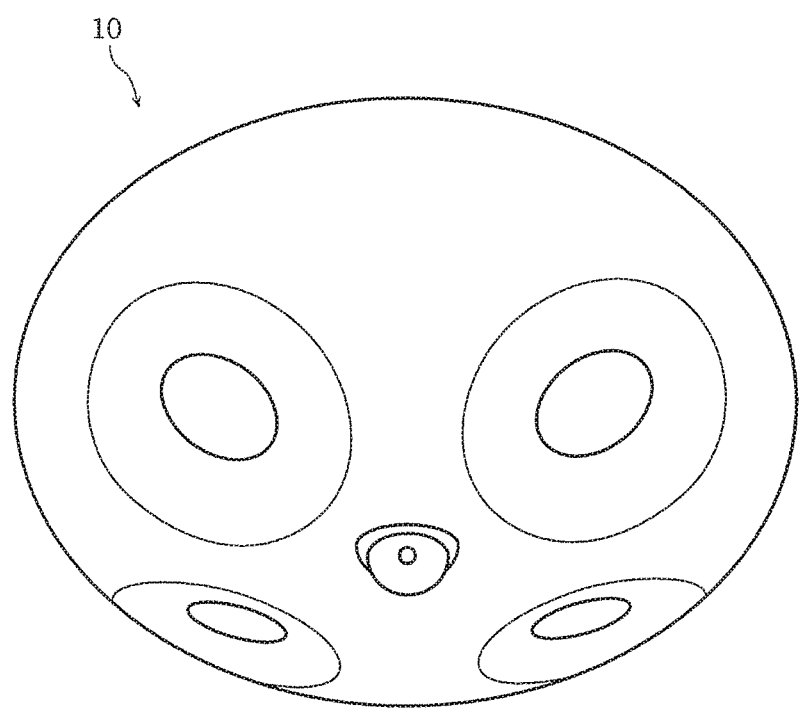
FIG. 1 is a perspective view of an aircraft according to an embodiment obliquely viewed from below.
Figure 2A:
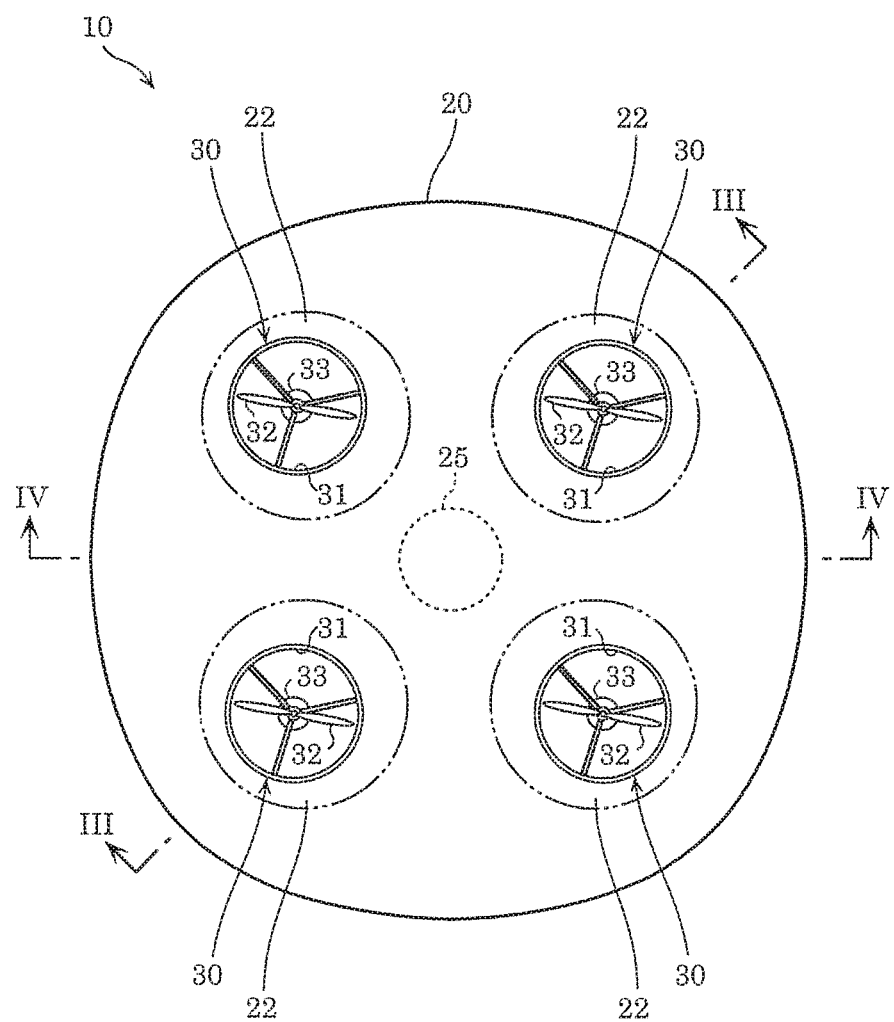
FIG. 2A is a plan view of the aircraft according to the embodiment.
Figure 2B:
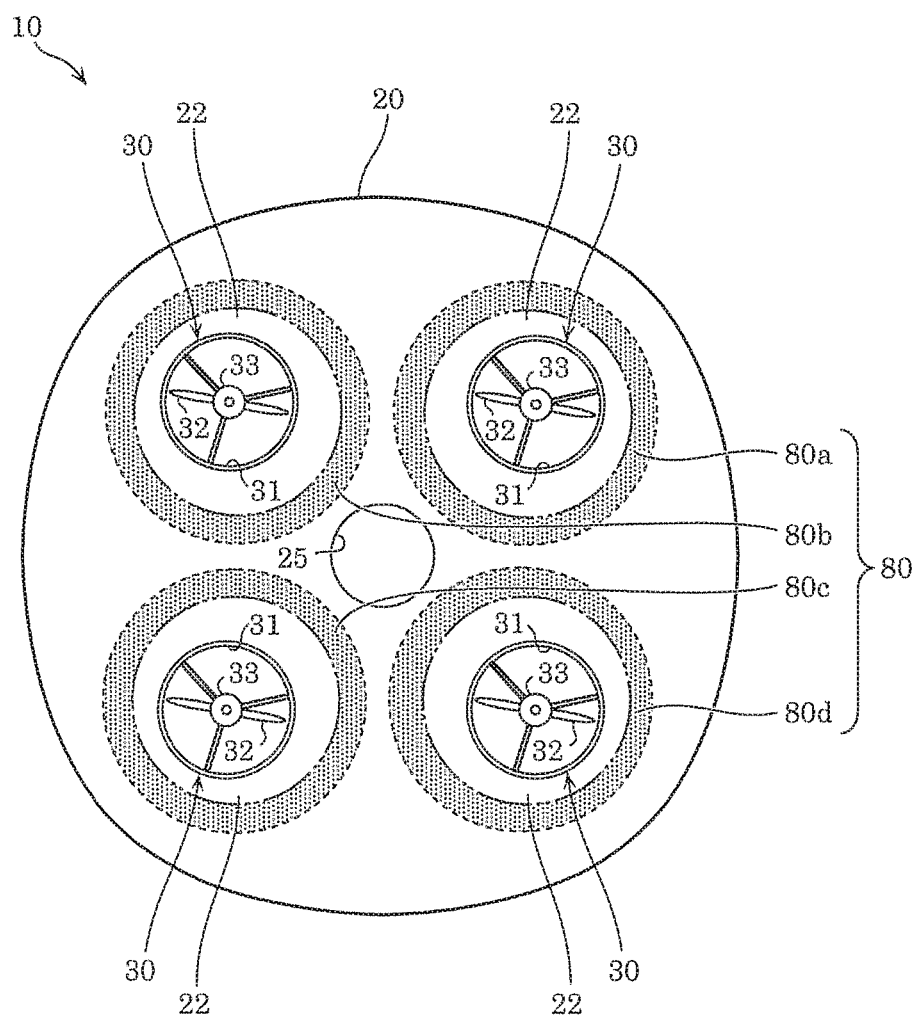
FIG. 2B is a bottom view of the aircraft according to the embodiment.
Figure 3:
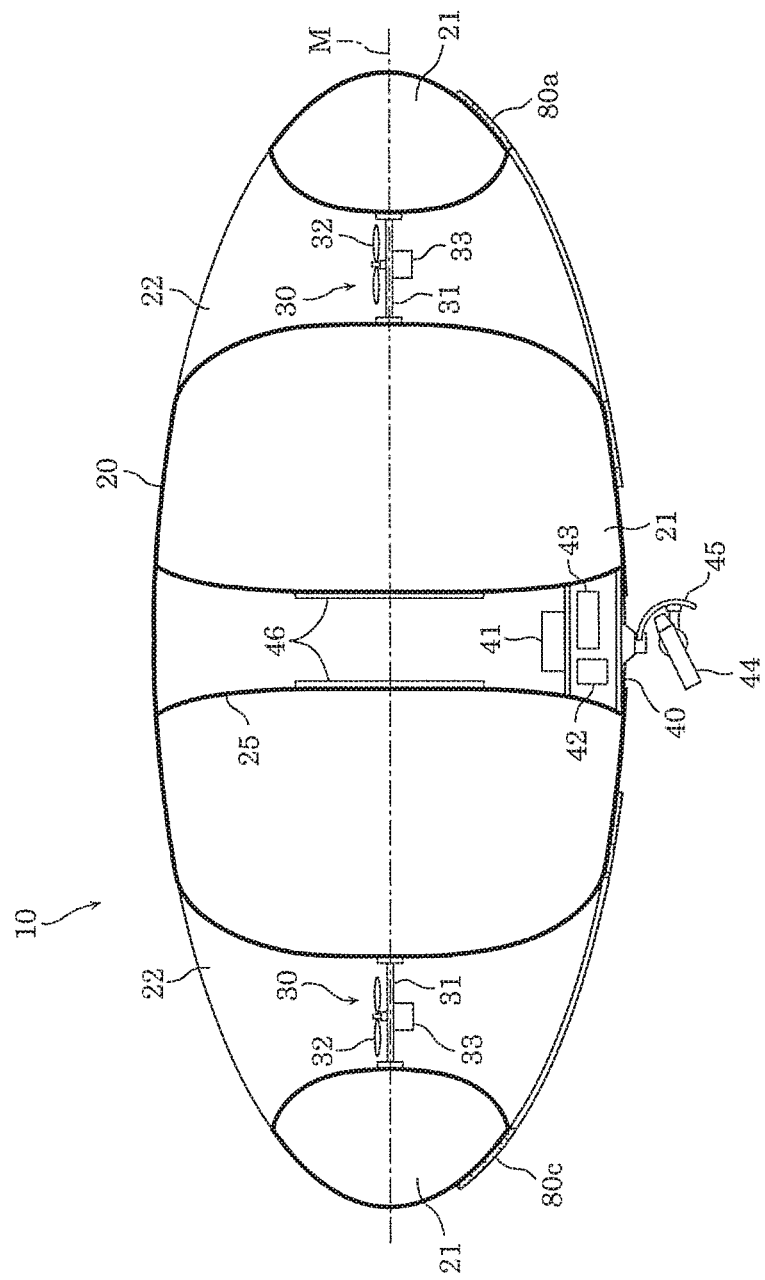
FIG. 3 is a cross-sectional view of the aircraft illustrating a cross section taken along in FIG. 2A.
Figure 4:
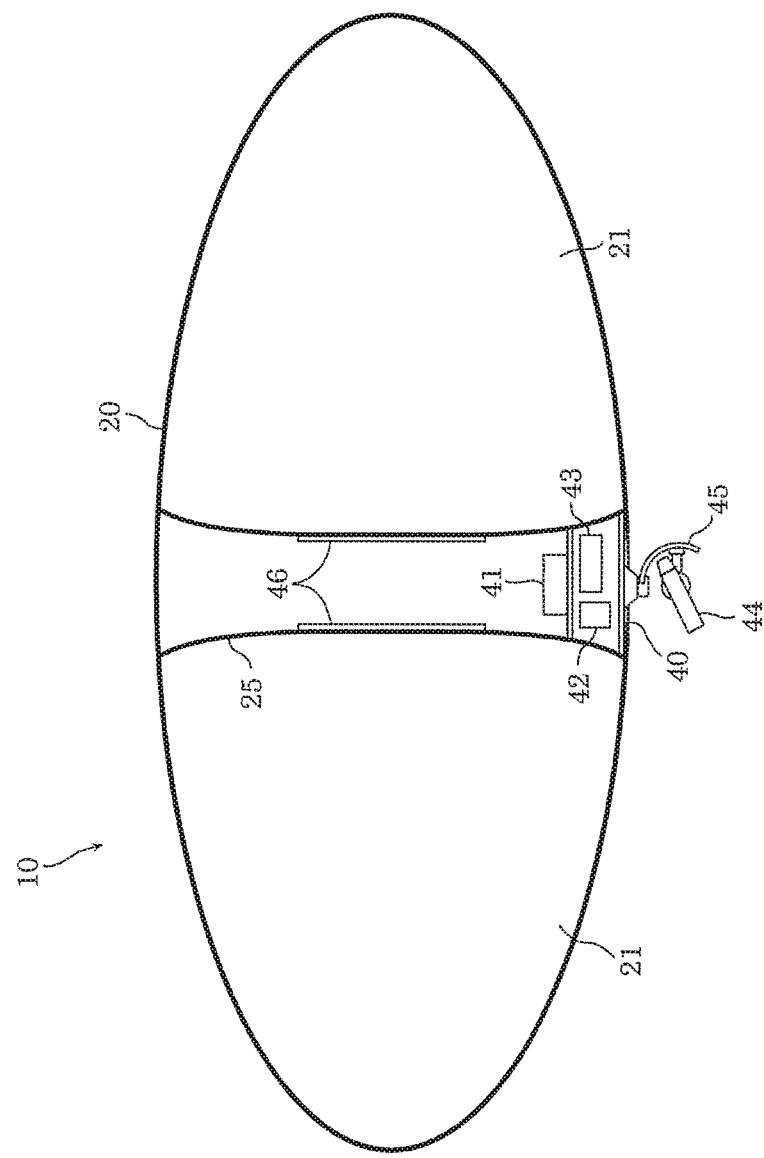
FIG. 4 is a cross-sectional view of the aircraft illustrating a cross section taken along IV-IV in FIG. 2A.

FIG. 1 is a perspective view of the aircraft according to the embodiment obliquely viewed from below. FIG. 2A is a plan view of the aircraft according to the embodiment. FIG. 2B is a bottom view of the aircraft according to the embodiment. Note that FIG. 2B omits illustration of mounted devices such as camera 44. FIG. 3 is a cross-sectional view of the aircraft illustrating a cross section taken along III-III in FIG. 2A. FIG. 4 is a cross-sectional view of the aircraft illustrating a cross section taken along IV-IV in FIG. 2A.

As illustrated in FIGS. 1, 2A, and 2B, aircraft 10 according to the present embodiment includes balloon 20 and four rotor units 30. Balloon 20 is an example of a shock absorber disposed so as to laterally cover rotor units 30 (four rotor units 30 in the present embodiment).

Aircraft 10 further includes detector 80 which detects the state of aircraft 10. Detector 80 in the present embodiment detects contact with or proximity to an object (an artificial or natural structure or a human body). Aircraft 10 can operate according to the result of detection by detector 80.

As illustrated in FIGS. 3 and 4, aircraft 10 includes controller 41, battery 42, projector 43, and camera 44, as mounted devices. Aircraft 10 further includes tight emitter 46.

[Balloon]

Next, balloon 20 is to be described.

Figure 5:
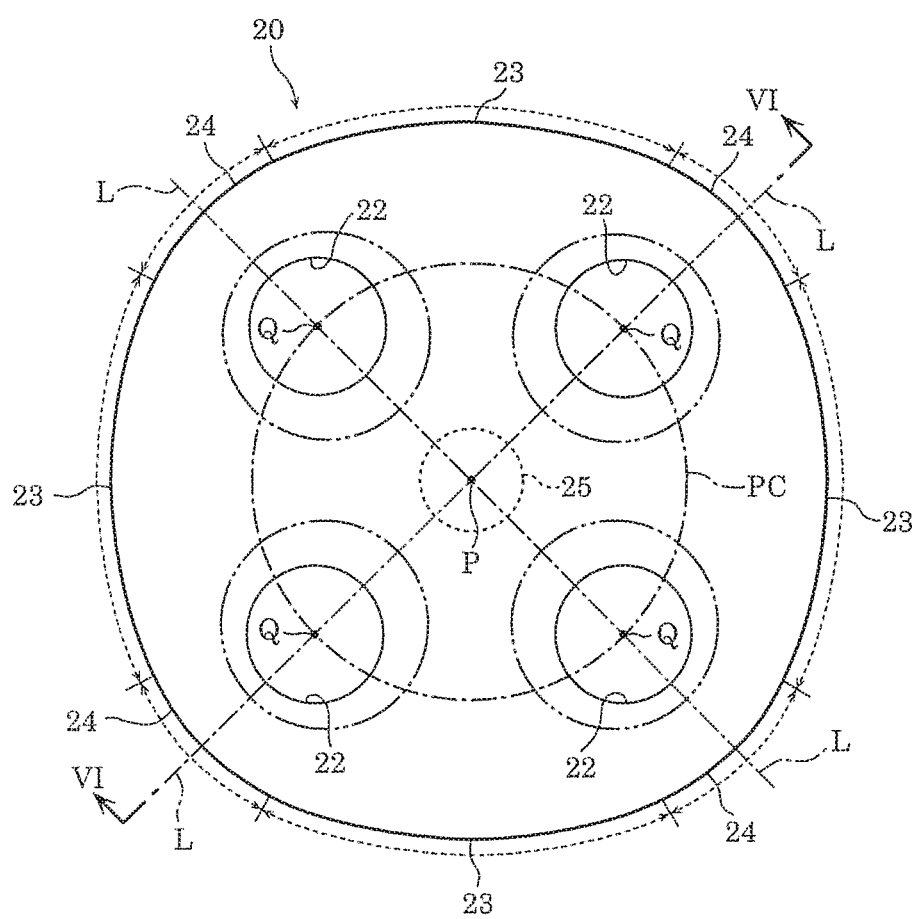
FIG. 5 is a plan view of a balloon according to the embodiment.
Figure 6:
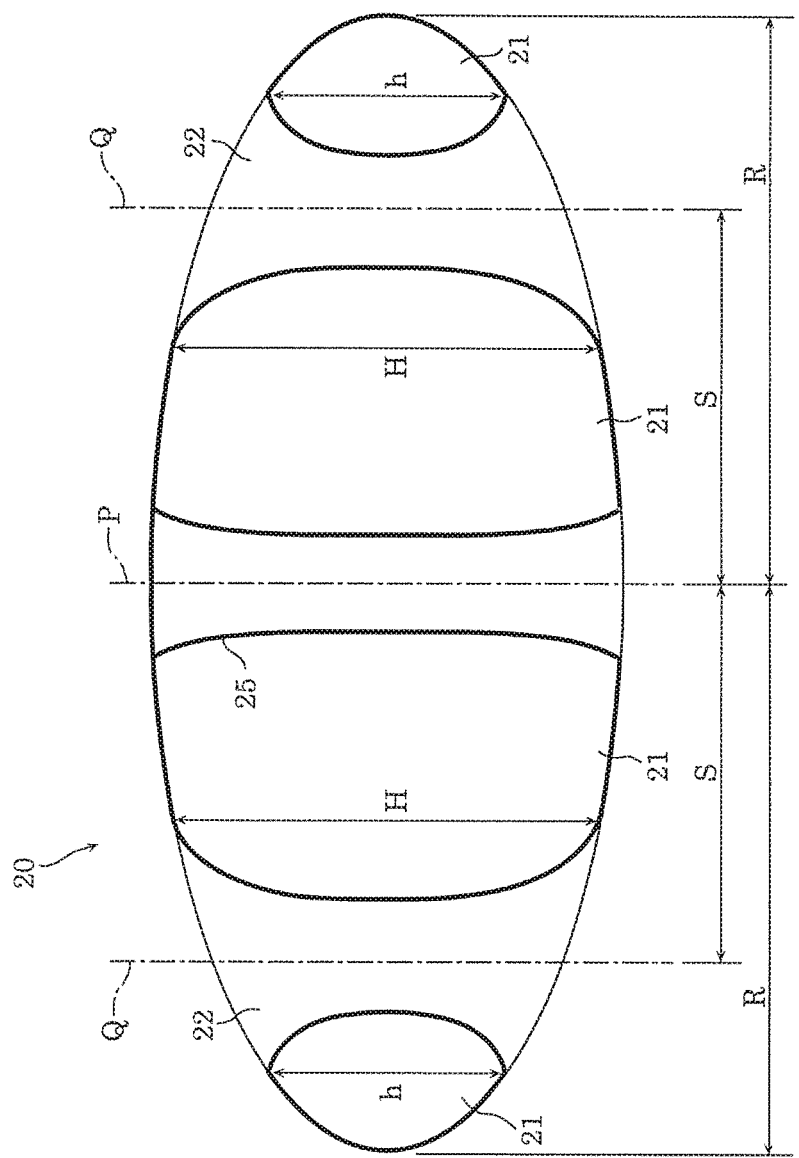
FIG. 6 is a cross-sectional view of the balloon illustrating a cross section taken along VI-VI in FIG. 5.

FIG. 5 is a plan view of the balloon according to the embodiment. FIG. 6 is a cross-sectional view of the balloon illustrating a cross section taken along VI-VI in FIG. 5.

As illustrated in FIGS. 3, 4, and 6, balloon 20 is made of a sheet-shaped flexible material (for example, polyvinyl chloride), and has gas space 21 which is a closed space surrounded by the sheet-shaped material. In FIGS. 3, 4, and 6, thick lines show the cross section of the sheet-shaped material of balloon 20. The sheet-shaped material that constitutes the external surface of balloon 20 is a semi-transparent white material which transmits light. A gas which is less dense than air is contained in gas space 21 formed by the sheet-shaped material. In the present embodiment, gaseous helium is contained in balloon 20.

As illustrated in FIG. 5, balloon 20 is formed into a shape rotationally symmetric about a straight line which extends in the up-and-down direction (in the direction perpendicular to the sheet surface of FIG. 5) as an axis of symmetry. The axis of symmetry is central axis P of balloon 20. The shape of balloon 20 illustrated in FIG. 5 has rotational symmetry of 90 degrees. Thus, each time balloon 20 rotates 90 degrees about central axis P, balloon 20 has the same shape as the shape before balloon 20 rotates.

As illustrated in FIG. 6, balloon 20 has a vertically low profile. Balloon 20 has a streamlined shape when laterally viewed. The height of balloon 20 gradually decreases from the central portion of balloon 20 toward the edge portion. Specifically, the cross-sectional shape of balloon 20 passing through central axis P as illustrated in FIG. 6 is an ellipse which has a major axis extending horizontally and a minor axis extending vertically. Thus, the cross-sectional shape of balloon 20 substantially has up and down symmetry. Note that the cross-sectional shape of balloon 20 does not need to be an exact ellipse, and may be a shape that can be recognized as an elliptical shape at a glance.

Ventilation holes 22 as many as rotor units 30 (four ventilation holes 22 in the present embodiment) are formed in balloon 20. As illustrated in FIG. 6, ventilation holes 22 are passages each having an approximately circular cross section, and pass through balloon 20 in the up-and-down direction. Center axes Q of ventilation holes 22 are substantially parallel to central axis P of balloon 20.

As illustrated in FIG. 6, center axes Q of ventilation holes 22 are provided on the edge side of balloon 20 relative to the intermediate position between central axis P and the edge of balloon 20. Specifically, distance S from central axis P of balloon 20 to central axis Q of ventilation hole 22 is longer than one half of distance R from central axis P of balloon 20 to the edge of balloon 20 (S>R/2). Thus, rotor units 30 are disposed in portions of balloon 20 closer to the edge. Such disposition of rotor units 30 is intended to fully secure the spacing between rotor units 30 and stabilize flight of aircraft 10.

The cross-sectional area (the area of a cross section orthogonal to central axis Q) of ventilation hole 22 is the smallest in the center portion in the up-and-down direction. Ventilation hole 22 has a shape having a cross-sectional area which gradually increases from the center portion in the up-and-down direction toward the upper end portion, and also gradually increases from the center portion in the up-and-down direction toward the lower end portion. In other words, the shape of ventilation hole 22 is a pillar shape having a narrow center portion in the height direction. As described above, balloon 20 has a shape having a height which gradually decreases from the central portion of balloon 20 to the edge portion. Accordingly, height h of each ventilation hole 22 near the edge of balloon 20 is lower than height H near the central portion of balloon 20.

As illustrated in FIG. 5, four ventilation holes 22 are disposed at 90-degree intervals about central axis P of balloon 20. The distance from central axis P of balloon 20 to central axis Q of each ventilation hole 22 is fixed. Specifically, center axes Q of ventilation holes 22 are substantially orthogonal to pitch circle PC about central axis P of balloon 20.

As illustrated in FIG. 5, the edge of balloon 20 in a top view includes reference curve portions 23 and small curvature radius portions 24, the numbers of which are the same as the number of ventilation holes 22 (four each in the present embodiment). Reference curve portion 23 and small curvature radius portion 24 are alternately disposed along the edge of balloon 20 in a top view. Small curvature radius portions 24 are disposed on the outside of ventilation holes 22 (in other words, on a side opposite central axis P of balloon 20), one for each of ventilation holes 22. Reference curve portions 23 are each disposed between two adjacent small curvature radius portions 24.

Reference curve portions 23 and small curvature radius portions 24 are all formed into curved lines. The middle point of each small curvature radius portion 24 in the length direction (circumferential direction) is located on straight line L orthogonal to both central axis P of balloon 20 and central axis Q of ventilation hole 22 closest to small curvature radius portion 24.

The curvature radius of small curvature radius portion 24 is smaller than the curvature radius of reference curve portion 23. Note that the curvature radius of reference curve portion 23 does not need to be constant for the entire length of reference curve portion 23. In addition, the curvature radius of small curvature radius portion 24 does not need to be constant for the entire length of small curvature radius portion 24. When the curvature radii of reference curve portion 23 and small curvature radius portion 24 are not constant, the maximum value of the curvature radius of small curvature radius portion 24 may be smaller than the minimum value of the curvature radius of reference curve portion 23.

Balloon 20 includes tubular connector 25 as illustrated in FIG. 6. Connector 25 is made of a transparent sheet material, and is formed into a cylindrical shape (or a circular tube shape) having a diameter that is slightly larger at an upper end portion and a lower end portion. Connector 25 is disposed in such an orientation that the central axis thereof substantially matches central axis P of balloon 20. In balloon 20, the upper end of connector 25 is joined to the upper portion of balloon 20, and the lower end of connector 25 is joined to the lower portion of balloon 20.

An upper-end surface of tubular connector 25 is closed, whereas the lower-end surface thereof opens. Accordingly, the interior space of connector 25 communicates with the outer space of balloon 20. Air is present in the internal space of connector 25, and the pressure applied in the internal space is substantially the same as an atmospheric pressure.

As described above, balloon 20 is formed into a shape rotationally symmetric about the axis of symmetry which is central axis P extending in the up-and-down direction. Gas such as helium filled in gas space 21 of balloon 20 is uniformly present in the entirety of gas space 21. Accordingly, the point of application of buoyancy (center of buoyancy) exerted by the gas filled in balloon 20 is substantially located on central axis P of balloon 20.

In the present embodiment, the internal volume (that is, the volume of gas space 21) of balloon 20 is set so that the magnitude of buoyancy obtained by the gas filled in balloon 20 is slightly less than the total weight of aircraft 10. Accordingly, aircraft 10 descends slowly even if all rotor units 30 stall in the sky. The slowness of the descending speed and the presence of balloon 20 around rotor units 30 secure the safety at the landing of aircraft 10.

Note that the greater air resistance exerts against the shape of aircraft 10 in the gravity direction, the more slowly aircraft 10 can descend.

[Rotor Unit]

The following describes rotor units 30.

As illustrated in FIGS. 2A and 3, rotor units 30 each include frame 31, propeller 32, and motor 33.

Frame 31 includes a portion formed into a ring shape, and spoke-shaped portions extending from the center toward the ring-shaped portion. Motor 33 is attached to the central portion of frame 31. Propeller 32 is attached to the output shaft of motor 33. The rotation axis of the output shaft of motor 33 (that is, the rotation axis of propeller 32) substantially matches the central axis of frame 31. Note that rotor units 30 may each include two propellers 32 which rotate in opposite directions about the same rotation axis. Specifically, rotor unit 30 may have contra-rotating propellers.

Rotor units 30 are each disposed in a different one of ventilation holes 22. Rotor units 30 are each disposed in such an orientation that the rotation axis of propeller 32 is substantially in the vertical direction. The rotation axis of propeller 32 substantially matches central axis Q of ventilation hole 22. Rotor unit 30 is disposed in a center portion of ventilation hole 22 in the up-and-down direction. Specifically, as illustrated in FIG. 3, rotor unit 30 is disposed so as to overlap center plane M of balloon 20 in the up-and-down direction. Center plane M is located in the center of balloon 20 in the up-and-down direction, and orthogonal to central axis P of balloon 20. The outside diameter of frame 31 of rotor unit 30 is approximately the same as the inside diameter of the center-portion of ventilation hole 22 in the up-and-down direction.

Rotor unit 30 is disposed in ventilation hole 22 such that the overall height of rotor unit 30 fits in. Specifically, balloon 20 laterally covers rotor units 30, across the heights of rotor-units 30 in the up-and-down direction. Note that the up-and-down direction refers to an up-and-down direction when aircraft 10 is in horizontal orientation and not inclined. Thus, the up-and-down direction is substantially parallel to the rotation axis of rotor unit 30.

Ventilation holes 22 may have a height that is at least the radius of rotor units 30 in both the upward and downward directions from the position of the center of rotor units 30 in the up-and-down direction. Accordingly, even if the rotation axis of propeller 32 of rotor unit 30 is rotated by 90 degrees relative to aircraft 10 due to an impact applied to rotor unit 30 or damage to rotor unit 30, rotor unit 30 can be inhibited from coming out of ventilation hole 22. Accordingly, balloon 20 can laterally cover rotor unit 30 to such an extent that rotor unit 30 cannot readily contact an object.

[Mounted Device, Light Emitter, and Others]

As described above, aircraft 10 includes controller 41, battery 42, projector 43, and camera 44, as mounted devices. Aircraft 10 further includes light emitter 46.

As illustrated in FIG. 3, disk 40 is disposed in aircraft 10. Disk 40 is a disc-shaped member having a diameter substantially equal to the diameter of the lower end of connector 25, and disposed so as to cover the lower end surface of connector 25. Disk 40 may be made of, for example, a resin material such as polypropylene (PP), polycarbonate (PC), polybutylene terephthalate (PBT), or ABS resin, or metal such as aluminum, copper, or stainless steel.

Camera 44 for capturing images is attached to the bottom surface of disk 40 via gimbal 45. Camera 44 is for capturing images from the sky, and is disposed in an orientation in which camera 44 faces obliquely downward. Gimbal 45 is a member for maintaining the orientation of camera 44 constant, even if the orientation of aircraft 10 changes.

Controller 41, battery 42, and projector 43 are disposed on disk 40. Controller 41 is a device which controls operation of plural rotor units 30. In the present embodiment, controller 41 receives an instruction signal transmitted from a radio remote control, controls rotor units 30, camera 44, projector 43, and LEDs, based on the received instruction signal. Further, controller 41 transmits an image captured by camera 44, for instance.

Note that controller 41 having the above function is achieved by a computer which includes a central processing unit (CPU), random access memory (RAM), read only memory (ROM), a communication interface, and an input/output (I/O) port, for instance.

Controller 41 may include a plurality of controllers having different functions. For example, controller 41 may include a flight controller which controls plural rotor units 30, and a device controller which controls other devices such as camera 44. The controllers may be achieved by different microcontrollers, for example.

Battery 42 supplies power to rotor units 30, controller 41, projector 43, and light emitter 46. Projector 43 projects an image on the inner surface of balloon 20 made of a semi-transparent material.

Light emitter 46 is an LED tape which includes an elongated flexible printed circuit board, and a large number of light emitting elements (LED elements, for example) mounted on the flexible printed circuit board in the longitudinal direction. Light emitter 46 is disposed in the center portion of connector 25 in the up-and-down direction in a tubular form obtained by spirally winding the LED tape with the LED elements facing outward. Specifically, light emitter 46 is disposed so as to cover the inner surface of connector 25. Accordingly, light emitter 46 receives pressure in gas space 21 applied to connector 25, and maintains a predetermined tubular shape of the space inside connector 25. Thus, light emitter 46 restricts, from the inside of connector 25, inward displacement of connector 25 so as to prevent connector 25 from having a smaller space than a predetermined tubular space. As described above, connector 25 is made of a transparent material. Accordingly, light emitted from light emitter 46 transmits connector 25, and hits the inner surface of balloon 20 made of a semi-transparent material.

Note that although light emitter 46 is formed into a tube by spirally winding the LED tape, the present disclosure is not limited thereto, and a member which achieves the tubular shape and the light emitting elements may be separate members. Specifically, the tubular light emitter may be achieved by a combination of a tube-shaped member having a tubular shape and a substrate on which LED elements are mounted.

Aircraft 10 may include only one of projector 43, camera 44, and light emitter 46, or may not include all of them. Furthermore, aircraft 10 may include another type of a device such as a speaker or a display panel. Specifically, aircraft 10 may include devices for achieving a basic flight function, such as rotor units 30, and may include a device which substantially does not affect flight such as projector 43 or camera 44 as appropriate, according to a user's demand, for example.

[Detector]

As illustrated in FIGS. 2B and 3, aircraft 10 includes detector 80 which detects the state of aircraft 10. In the present embodiment, detector 80 includes sensors 80a to 80d disposed in positions in one-to-one-correspondence with plural rotor units 30.

Note that in FIG. 2B, examples of areas for disposing sensors 80a to 80d are expressed as dotted regions.

Sensors 80a to 80d each detect proximity to or contact with an object. In the present embodiment, sensors 80a to 80d each include one or more sheet-shaped or tape-shaped pressure-sensitive sensors, for example, and output a predetermined signal which indicates contact with an object when a pressure greater than or equal to a predetermined value is applied due to contact of the object.

Sensors 80a to 80d are each disposed so as to surround a different one of ventilation holes 22. Accordingly, a sensor among sensors 80a to 80d detects contact of an object with a region of balloon 20 around ventilation hole 22, that is, a region of the bottom surface of balloon 20 near rotor unit 30.

Controller 41 receives, as a result of detection by detector 80, a predetermined signal output by the sensor among sensors 80a to 80d, and controls operation of one or more rotor units 30, based on the detection result indicated by the predetermined signal. An example of control of one or more rotor units 30 by controller 41 based on the result of detection by detector 80 is to be later described with reference to FIGS. 7 to 11B.

[Flying Orientation of Aircraft]

As described above, in aircraft 10, mounted devices such as controller 41 and battery 42 are disposed in the lower end portion of the internal space of connector 25. In other words, mounted devices having a comparatively great weight are disposed in the lower portion of aircraft 10 in a concentrated manner. As a result, the center of gravity of the entirety of aircraft 10 is located below the point of application of buoyancy exerted by a gas filled in balloon 20. Accordingly, even in a state where rotor units 30 have stalled, aircraft. 10 maintains such an orientation that camera 44 faces downward, without laterally rotating or being vertically flipped, for instance.

Mounted devices having a comparatively great weight are disposed below rotor units 30. As a result, the center of gravity of the entirety of aircraft 10 is located below the point of application of buoyancy obtained by operation of rotor units 30. Accordingly, while rotor units 30 are operating, aircraft 10 maintains such an orientation that camera 44 faces downward.

Aircraft 10 includes plural rotor units 30. Accordingly, when aircraft 10 is to be moved substantially horizontally, horizontal propulsion can be enhanced by making the rotational speed of rotor unit 30 located on a side opposite the movement direction faster than the rotational speed of rotor unit 30 located in the movement direction.

Note that the "rotational speed of rotor unit 30" means the rotational speed of propeller 32 included in rotor unit 30 (the number of rotations of propeller 32 per unit time).

[Example of Controlling Operation of Aircraft]

Next, controlling operation of aircraft 10 based on the detection result which indicates the state of aircraft. 10 is to be described with reference to FIGS. 7 to 11B. First, an example of basic control of operation is described with reference to FIGS. 7 and 8.

Figure 7:
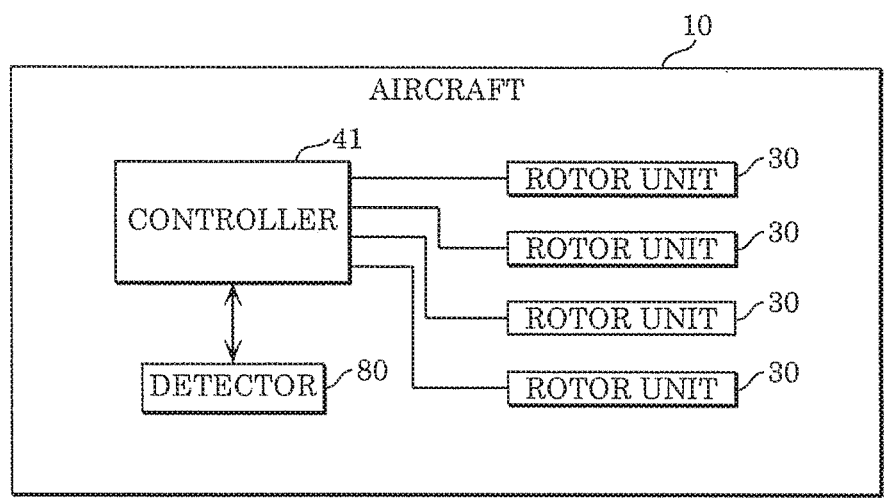
FIG. 7 is a block diagram illustrating a schematic configuration of the aircraft according to the embodiment.
Figure 8:
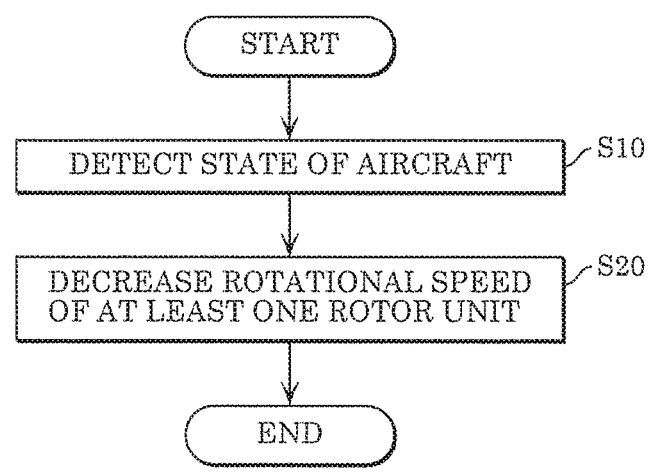
FIG. 8 is a flowchart illustrating a flow of basic control of operation according to a state of the aircraft, in the aircraft according to the embodiment.

FIG. 7 is a block diagram illustrating the schematic configuration of aircraft 10 according to the embodiment. Note that FIG. 7 omits illustration of other elements such as battery 42 and camera 44. FIG. 8 is a flowchart illustrating a flow of basic control of operation in aircraft 10 according to the embodiment, in accordance with the state of aircraft 10.

As illustrated in FIG. 7, aircraft 10 includes plural rotor units 30 (four rotor units 30 in the present embodiment), controller 41, and detector 80. Plural rotor units 30 generate thrust for the flight of aircraft 10. Controller 41 controls rotation of propellers 32 included in plural rotor units 30. Detector 80 transmits a predetermined signal which indicates the detection result to controller 41.

Aircraft 10 having the above configuration executes information processing and operation illustrated in FIG. 8. Specifically, detector 80 detects the state of aircraft 10 (S10). According to the result of detection by detector 80, controller 41 decreases the rotational speed of propeller 32 in at least one rotor unit 30 among plural rotor units 30 (S20).

Accordingly, if an abnormal state (contact with an object or loss of control of aircraft 10) occurs in aircraft 10 due to, for example, a blast or an operational error, the rotation of propeller 32 in at least one of rotor units 30 can be decreased. For example, rotation of propeller 32 in the at least one of rotor units 30 can be stopped. Thus, this reduces a possibility that an object in contact with aircraft 10 is damaged by rotating propeller 32. Furthermore, occurrence of a situation in which, for example, aircraft 10 travels in an unexpected direction is inhibited by reducing thrust produced by plural rotor units 30.

The following describes a more specific example of controlling operation, according to the state of aircraft 10, with reference to FIGS. 9 to 11B.

Figure 11A:
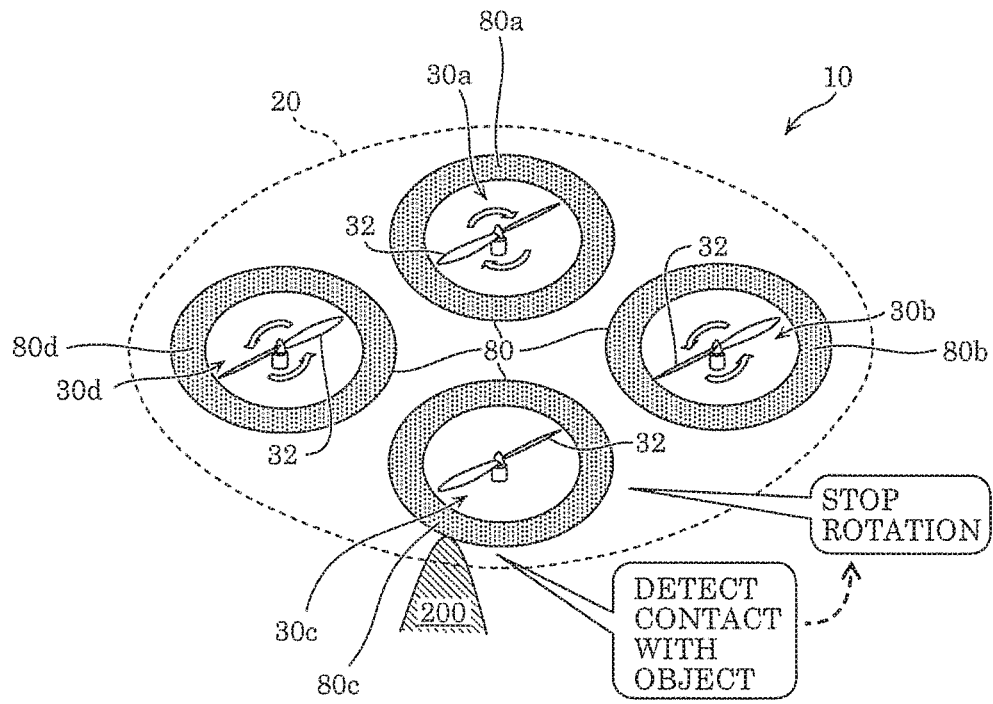
FIG. 11A illustrates an example of operation of the aircraft corresponding to FIG. 9.

FIG. 9 is a flowchart illustrating a first specific example of controlling operation in aircraft 10 according to the embodiment, in accordance with the state of aircraft 10. FIG. 10 illustrates correspondences between plural rotor units 30 and sensors 80a to 80d included in detector 80. FIG. 11A illustrates an example of operation of aircraft 10 corresponding to FIG. 9, and FIG. 11B illustrates a different example of operation of aircraft 10 corresponding to FIG. 9.

Figure 11B:
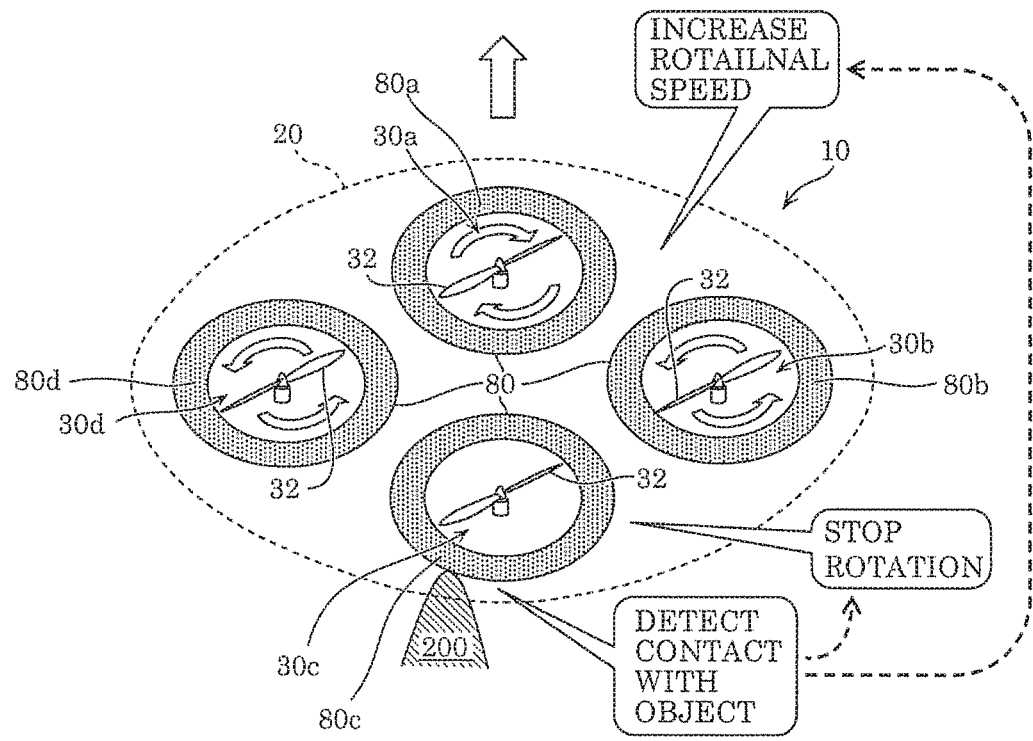
FIG. 11B illustrates a different example of operation of the aircraft corresponding to FIG. 9.

Note that in FIGS. 10 to 11B, the dotted line indicates the contour of balloon 20 in a simple manner, and the illustration of other elements such as camera 44 is omitted. For convenience, s of plural rotor units 30 are represented by 30a, 30b, 30c, and 30d in order to distinguish plural rotor units 30 from one another.

Here, rotor units 30a and 30c generate upward thrust using propellers 32 that rotate clockwise in a plan view, and rotor units 30b and 30d generate upward thrust using propellers 32 that rotate counterclockwise in a plan view. Accordingly, torque about central axis P of balloon 20 can be mostly eliminated, and in this case, rotation of aircraft 10 about central axis P is inhibited.

As illustrated in FIG. 9, in aircraft 10, if detector 80 detects contact with or proximity to an object (Yes in S11), controller 41 decreases the rotational speed of rotor unit 30 closest to the object (S21). Specifically, controller 41 decreases the rotational speed of propeller 32 in at least one rotor unit 30 among plural rotor units 30, according to the result of detection by detector 80. Specifically, controller 41 decreases the rotational speed to zero.

In the present embodiment, detector 80 includes, as sensors 80a to 80d, sensors which detect contact with an object as mentioned above, and if any of sensors 80a to 80d detects contact with an object, detector 80 outputs a predetermined signal which indicates the detection result to controller 41.

Sensors 80a to 80d are each disposed in correspondence with a different one of rotor units 30 (see FIGS. 2B, 3, and 10). Specifically, as illustrated in FIG. 10, sensor 80a is disposed in a position corresponding to rotor unit 30a, and sensor 80b is disposed in a position corresponding to rotor unit 30b. Furthermore, sensor 80c is disposed in a position corresponding to rotor unit 30c, and sensor 80d is disposed in a position corresponding to rotor unit 30d.

Accordingly, when detector 80 detects contact with an object, detector 80 or controller 41 can identify to which rotor unit 30 among plural rotor units 30 the object is closest. Accordingly, controller 41 can control each of plural rotor units 30 appropriately, according to the position of the object.

For example, as illustrated in FIG. 11A, assume a case in which object 200 contacts a region of aircraft 10 in which sensor 80c is disposed. In this case, detector 80 outputs a predetermined signal which indicates that sensor 80c has detected contact with an object, for example. When controller 41 receives the predetermined signal, controller 41 stops rotation of propeller 32 in rotor unit 30c disposed in a position corresponding to sensor 80c. Accordingly, this reduces a possibility that object 200 is damaged by propeller 32 in rotor unit 30c.

Note that controller 41 may decrease the rotational speed of propellers 32 in plural rotor units 30 including one rotor unit 30 closest to object 200. For example, if sensor 80c detects contact with an object, controller 41 may decrease the rotational speed of rotor unit 30c and the rotational speed of rotor units 30b and 30d that are on the right and left of rotor unit 30c. Alternatively, the rotational speed of all propellers 32 in plural rotor units 30 included in aircraft 10 may be decreased. Accordingly, this reduces a possibility that object 200 is damaged by one or more of propellers 32 included in plural rotor units 30.

Note that when the rotational speed of one or more rotor units 30 is decreased due to detection of contact of aircraft 10 with an object, aircraft 10 may descend due to the loss of at least a portion of upward propulsion exerted by plural rotor units 30. In this case, however, aircraft 10 includes balloon 20 which functions as a shock absorber, and thus safety of aircraft 10 or an object present at a location where aircraft 10 descends can be secured. Aircraft 10 gradually descends due to buoyancy of balloon 20, which also contributes to securing safety.

Plural rotor units 30 included in aircraft 10 may be each controlled as illustrated in FIG. 11B, for example.

Specifically, when detector 80 outputs a predetermined signal indicating that sensor 80c has detected contact with an object, controller 41 stops rotation of propeller 32 in rotor unit 30c disposed in a position corresponding to sensor 80c. Furthermore, controller 41 increases the rotational speed of propellers 32 in rotor units 30a, 30b, and 30d.

In this case, thrust generated by rotor units 30a, 30b, and 30d, aircraft 10 can be moved upward so as to be moved away from object 200. As a result, the state where aircraft 10 and object 200 are in contact is prevented from being maintained. Thus, this more reliably protects object 200 and aircraft 10.

Specifically, in FIG. 11B, if rotation of propeller 32 in rotor unit 30c is stopped and the rotational speed of propeller 32 in rotor unit 30a is increased, aircraft 10 is inclined, and as a result, sensor 80c may be in contact with object 200 for a longer time or may more strongly contact object 200. In order to avoid this, propellers 32 in rotor units 30a and 30c are stopped, and the rotational speed of propellers 32 in rotor units 30b and 30d is increased. Then, aircraft 10 is raised while inhibiting aircraft 10 from being inclined. Then, when aircraft 10 is moved away from object 200 by a predetermined distance, all rotor units 30a to 30d are caused to rotate.

Note that either detector 80 or controller 41 may identify at least one rotor unit 30 that is closest to object 200.

For example, if sensors 80a to 80d included in detector 80 are individually connected with controller 41 via signal lines, controller 41 can identify which of sensors 80a to 80d has transmitted a predetermined signal which indicates contact with an object (detection result). Controller 41 can identify at least one rotor unit 30 corresponding to the sensor which has transmitted the detection result by referring to information indicating correspondences between plural rotor units 30 and sensors 80a to 80d.

Furthermore, assume the case where, for example, detector 80 includes a sensor controller which controls start of sensing by each of sensors 80a to 80d. In this case, the sensor controller identifies the sensor which has detected contact with an object from among sensors 80a to 80d, and transmits a predetermined signal which includes information indicating the identified sensor to controller 41. Accordingly, controller 41 can identify at least one rotor unit 30 which includes propeller 32 whose rotational speed is to be decreased. Note that the sensor controller is achieved by a computer which includes, for instance, CPU, RAM, ROM, a communication interface, and an I/O port, similarly to controller 41, for example.

Detector 80 detects contact with an object in the present embodiment, yet detector 80 may detect an object near aircraft 10 before the object contacts aircraft 10. In other words, detector 80 may output a predetermined signal indicating proximity to an object as a detection result. In this case, detector 80 can be achieved by an electrostatic capacitance sensor which detects presence of a nearby object, based on, for example, a change in the electrostatic capacitance of an electrode.

Furthermore, detector 80 may be achieved by, for instance, a distance measuring device which can detect presence of an object within a predetermined distance range using emitted laser light or an emitted sound, wave reflected off the object. Detector 80 may detect an object present around aircraft 10 by, for example, analyzing imaging data captured by camera 44 included, in aircraft 10.

In this manner, for example, an object which is present in a position comparatively distant (for example, several tens of meters away) from aircraft 10 can be recognized using detector 80 which uses laser light, a sound wave, or imaging data. Further, detector 80 can cause controller 41 to decrease the rotational speed of propeller 32 in at least one rotor unit 30, upon the object entering an area of a predetermined distance (for example, several meters) from aircraft 10, which is a trigger.

Note that when detector 80 uses imaging data captured by camera 44, camera 44 may have the function of detector 80. In other words, camera 44 may function as detector 80.

In any of the above cases, an approximate position of an object present in a position comparatively close to aircraft 10 relative to aircraft 10 can be identified. Thus, aircraft 10 can identify at least one rotor unit 30 closest to the object. As a result, for example, the rotational speed of propeller 32 in at least one rotor unit 30 can be decreased, and thus a possibility that the object may be damaged by rotating propeller 32 is reduced.

In addition, if detector 80 detects proximity to an object, controller 41 may further increase the rotational speed of one or more other rotor units 30. Accordingly, aircraft 10 can be moved away from the object. Specifically, a possibility of the object contacting aircraft 10 can be reduced.

Advantageous Effects and Others

Aircraft 10 according to the present embodiment includes: plural rotor units 30 each of which includes propeller 32 and motor 33 which drives propeller 32, and generates thrust for flight of aircraft 10; controller 41 which controls rotation of propellers 32 included in plural rotor units 30; balloon 20 which laterally covers plural rotor units 30; and detector 80 which detects a state of aircraft 10. Controller 41 decreases a rotational speed of propeller 32 included in at least one rotor unit 30 among plural rotor units 30, according to a result of detection by detector 80.

According to this configuration, for example, when an abnormality regarding the state of aircraft 10 such as contact of aircraft 10 with or proximity of aircraft 10 to an object has occurred, detector 80 can detect the abnormality. Controller 41 can decrease the rotational speed of one or more rotor units 30 when detector 80 detects an abnormality. Accordingly, this reduces a possibility that one or more rotating propellers 32 damage the object. In addition, in this case, even if aircraft 10 descends due to a decrease in upward thrust, balloon 20 which functions as a shock absorber is included, and thus safety of aircraft 10 or an object present at a location where aircraft 10 descends can be secured.

In the present embodiment, balloon 20 laterally covers plural rotor units 30, across a height of plural rotor units 30 in an up-and-down direction. Thus, when aircraft 10 contacts an object during the flight, not rotor units 30 but balloon 20 contacts the object. Specifically, even if aircraft 10 contacts an object during the flight, aircraft 10 can avoid contact of rotor units 30 with the object. Accordingly, for example, even if aircraft 10 contacts an object during the flight, damage to rotor units 30 due to the contact can be prevented, so that aircraft 10 can be allowed to continue stable flight.

If aircraft 10 falls, balloon 20 hits, for instance, the ground, and consequently deforms, which reduces the impact. Thus, according to the present embodiment, damage to rotor units 30 due to the fall can be prevented. Even if aircraft 10 falls, balloon 20 contacts an object, rather than rotor units 30 or mounted devices, which can reduce damage to the object due to contact with aircraft 10.

A gas less dense than air is contained in balloon 20. Gaseous helium is contained in balloon 20 in the present embodiment.

According to this configuration, aircraft 10 flies using both buoyancy obtained by the gas filled in balloon 20 and buoyancy obtained by air currents generated by rotor units 30 (upward thrust). Accordingly, as compared with the case where aircraft 10 flies using only the buoyancy obtained by operation of rotor units 30, consumption of energy such as power to be used to drive rotor units 30 can be kept low. Accordingly, the time of flight of aircraft 10 can be extended, for example.

When the rotational speed of one or more rotor units 30 is decreased by detecting contact of aircraft 10 with an object, aircraft 10 may descend due to the loss of at least a portion of upward propulsion generated by rotor units 30. However, in this case, aircraft 10 includes balloon 20 which functions as a shock absorber, and thus the safety of aircraft 10 or an object present at a location where aircraft 10 descends can be secured. Furthermore, aircraft 10 gradually descends due to buoyancy of balloon 20, which contributes to securing safety.

Balloon 20 includes plural ventilation holes 22 which pass through balloon 20 in an up-and-down direction, and plural rotor units 30 are each disposed in a different one of plural ventilation holes 22.

Accordingly, for example, this reduces a possibility that wind blowing from each rotor unit 30 is disturbed by wind blowing from other rotor units 30. Furthermore, for example, this reduces a possibility that rotor units 30 interfere each other even if the shape of balloon 20 is distorted due to collision with an obstacle, for instance.

More specifically, in balloon 20, a space filled with gas such as helium is formed not only in a region which surrounds the entirety of rotor units 30 disposed in predetermined positions, but also in regions between rotor units 30. Thus, according to the present embodiment, the internal volume of balloon 20 can be secured, and an increase in the size of balloon 20 can be prevented.

In aircraft 10 which includes plural rotor units 30, the spacing between rotor units 30 may be increased to some extent, in order to allow aircraft 10 to stably fly. On the other hand, as described above, in balloon 20 according to the present embodiment, gas space 21 filled with gas such as helium is present also in regions between plural rotor units 30. Thus, according to the present embodiment, the amount of gas filled can be secured while inhibiting an increase in the size of aircraft 10, and furthermore, the spacing between rotor units 30 can be secured. Accordingly, the flight state of aircraft 10 can be stabilized.

When the result of detection by detector 80 indicates proximity to or contact with an object, controller 41 included in aircraft 10 decreases a rotational speed of propeller 32 in at least one rotor unit 30 closest to the object among plural rotor units 30.

Specifically, when at least one of aircraft 10 and an object comes near or contacts the other, in order to reduce possibility that the object is damaged, aircraft 10 identifies one or more rotor units 30 in positions close to the object. Furthermore, aircraft 10 decreases the rotational speed of propeller 32 in each of identified one or more rotor units 30. Accordingly, safety of aircraft 10 further improves.

When the result of detection by detector 80 indicates proximity to or contact with an object, controller 41 increases a rotational speed of propeller 32 included in each of one or more rotor units 30 different from at least one rotor unit 30 closest to the object, among plural rotor units 30.

Accordingly, thrust produced by one or more different rotor units 30 is increased, and as a result, for example, aircraft 10 can be caused to move away from the object in proximity to or in contact with aircraft 10. Accordingly, contact of aircraft 10 with an object or maintaining the contact state is avoided, so that the object and aircraft 10 can be more reliably protected.

Controller 41 decreases the rotational speed of propeller 32 included in at least one rotor unit 30 to zero, according to the result of detection by detector 80.

Specifically, if detector 80 detects abnormalities such as contact of aircraft 10 with an object, rotation of propeller 32 in each of one or more rotor units 30 is stopped. Accordingly, for example, an object in contact with or likely to contact aircraft 10 is more reliably protected.

Controller 41 can decrease rotational speeds of propellers 32 included in all of plural rotor units 30, according to the result of detection by detector 80. Also, by doing so, for example, an object in contact with or likely to contact aircraft 10 is more reliably protected.

Note that sensors 80a to 80d are disposed on the lower surface of balloon 20, but may be disposed on the upper surface or both the upper and lower surfaces of balloon 20. In that case, for example, such disposition is a safety measure for the upper side of aircraft 10 against object 200.

Note that detector 80 detects contact of aircraft 10 with an object and proximity of aircraft 10 to an object in the present embodiment. However, aircraft 10 may detect abnormalities regarding the state of aircraft 10, other than contact with or proximity to an object, and may decrease the number of rotations of propeller 32 in at least one rotor unit 30 according to the detection result.

In view of this, the following describes, as variations of the embodiment, an aircraft which includes a detector which detects abnormalities other than contact with or proximity to an object, focusing on a difference from the above embodiment.

Variation 1

Figure 12A:
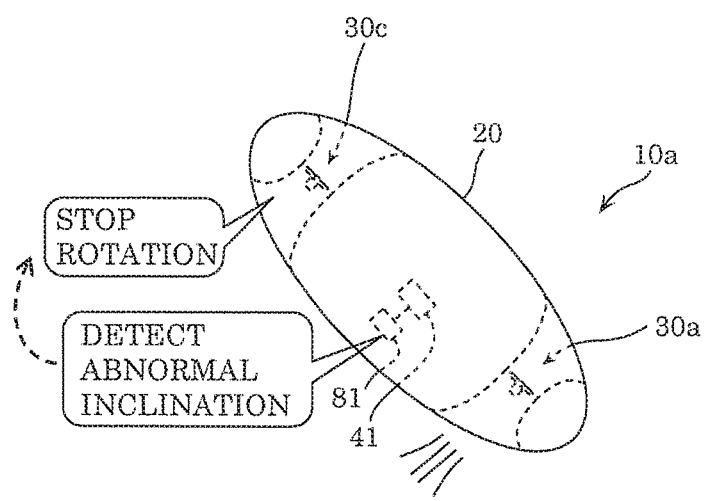
FIG. 12A illustrates a first example of controlling operation of an aircraft, according to Variation 1 of the embodiment.
Figure 12B:
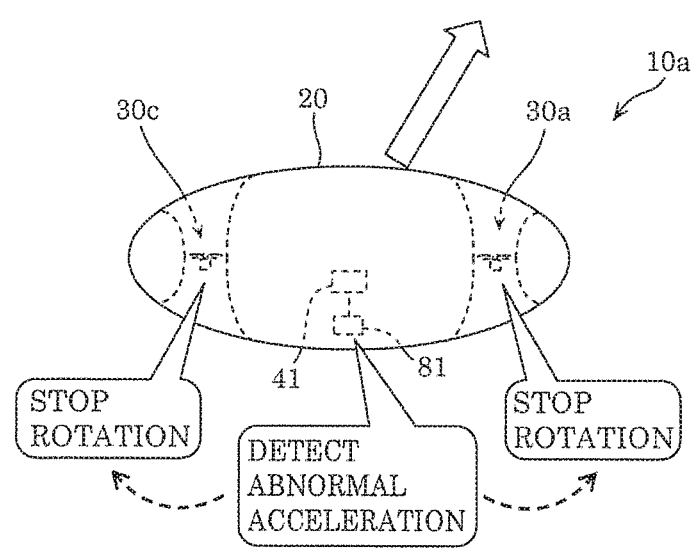
FIG. 12B illustrates a second example of controlling operation of the aircraft, according to Variation 1 of the embodiment.

FIG. 12A illustrates a first example of controlling operation of aircraft 10a according to Variation 1 of the embodiment. FIG. 12B illustrates a second example of controlling operation of aircraft 10a according to Variation 1 of the embodiment. Note that FIGS. 12A and 12B are side views of aircraft 10a, illustrate rotor units 30a and 30c diagonally disposed in balloon 20 using the dotted lines, and omit illustration of rotor units 30b and 30d. Detector 81 and controller 41 are schematically expressed by the dotted lines. These matters also apply to FIG. 13 described below.

Aircraft 10a according to the variation includes detector 81 as illustrated in FIGS. 12A and 12B. Detector 81 includes an acceleration sensor, or more specifically, a triaxial acceleration sensor. Detector 81 can detect inclination and acceleration of aircraft 10a. Note that detector 81 may detect inclination using a sensor of a type other than the triaxial acceleration sensor, for example. For example, detector 81 may detect inclination using a gyro sensor. In other words, there is no limitation in particular to the type of and the number of sensors included in detector 81 which are used to detect the acceleration and inclination of aircraft 10a, as long as the sensor(s) can detect the acceleration and inclination of aircraft 10a.

For example, assume the case where aircraft. 10a is greatly inclined as illustrated in FIG. 12A, due to occurrence of a gust. In this case, detector 81 detects that the orientation of aircraft 10a is not normal, and transmits a predetermined signal which indicates so to controller 41. Controller 41 decreases the rotational speed of propeller 32 in at least one rotor units 30 according to the detection result.

For example, detector 81 outputs a predetermined signal which includes information (inclination information) indicating an inclination direction in which aircraft 10a is inclined. Controller 41 identifies at least one rotor unit 30 in a relatively upper position among rotor units 30, using the inclination information indicated by the predetermined signal. Controller 41 identifies rotor unit 30c in the example illustrated in FIG. 12A. In this case, controller 41 stops rotation of propeller 32 in rotor unit 30c.

Accordingly, thrust generated by rotor unit 30a in a relatively lower position works in a direction which inhibits aircraft 10a from being inclined, and as a result, the inclination quantity of aircraft 10a decreases. Specifically, the greatly inclined state of aircraft 10a is corrected so that the orientation of aircraft 10a is brought close to a normal orientation.

Note that controller 41 may control rotor unit 30a to increase the number of rotations of rotor unit 30a, at this time. Accordingly, the greatly inclined state of aircraft 10a can be corrected in a short time.

Note that detector 81 may detect only the angle of inclination, for example. In this case, controller 41 may determine, using the angle of inclination indicated by the detection result, whether inclination of aircraft 10a is normal, and may decrease the rotational speed of at least one rotor unit 30, according to the decision result.

Specifically, examples of "when the orientation is not normal" in the case of the variation include, for instance, the case where a difference between the detected angle of inclination of aircraft 10a and the angle of inclination which should originally be according to an instruction from a radio remote control is greater than or equal to a threshold, and the case where the detected angle of inclination of aircraft 10a falls outside a predetermined range. Thus, either of detector 81 and controller 41 may determine whether the orientation of aircraft 10a is normal.

In addition, detector 81 which includes a triaxial acceleration sensor can detect that the acceleration of aircraft 10a is not normal, for example.

For example, assume the case where aircraft 10a suddenly moves at high speed by being blown by a gust, as illustrated in FIG. 12B. In this case, detector 81 detects that acceleration is not normal, and transmits the detection result which indicates so to controller 41. Controller 41 decreases the rotational speed of propeller 32 in at least one rotor unit 30 according to the detection result.

Controller 41 decreases, to zero, the rotational speed of propellers 32 in all rotor units 30 included in aircraft 10a, for example.

Here, if the acceleration of aircraft 10a is very high, it can be considered that aircraft 10a loses its balance and the orientation thereof becomes unstable. If rotor units 30 are kept driven in a state where the orientation of aircraft 10 is in an unstable state, thrust generated by rotor units 30 may work in an unintended direction, and as a result, aircraft 10a may be in a more unstable state. In view of this, rotation of all propellers 32 in all rotor units 30 included in aircraft 10a is stopped in this case. This reduces a possibility that aircraft 10a travels in an unexpected direction, for example.

Note that detector 81 may detect only acceleration, for example. In this case, controller 41 may determine, using the acceleration indicated by the detection result, whether the acceleration of aircraft 10a is normal or abnormal, and may decrease the rotational speed of at least one rotor unit 30 according to the determination.

Specifically, examples of "when acceleration is not normal" include, for instance, the case where a difference between the detected acceleration of aircraft 10a and the acceleration which should originally be according to an instruction from the radio remote control is greater than or equal to a threshold, and the case where the detected acceleration of aircraft 10a falls outside a predetermined range. Thus, either of detector 81 and controller 41 may determine whether the acceleration of aircraft 10a is normal.

For example, the case where the acceleration of aircraft 10a is substantially zero when originally, predetermined acceleration is to be caused according to an instruction from the radio remote control is also an example of "when acceleration is not normal". This state may occur due to, for example, aircraft 10a being caught in a certain obstacle or being held by a person.

In this case, for example, wasteful energy consumption is inhibited by decreasing the rotational speed of at least one rotor unit 30, and reduction of power in battery 42 is inhibited as a result. Furthermore, a possibility that rotating propeller 32 interferes an obstacle or a person which is the cause of substantially zero acceleration is reduced.

For example, if aircraft 10a is moving at a velocity which is not normal, detector 81 may output the detection result which indicates that the velocity is not normal. Note that detector 81 or controller 41 can calculate the velocity of aircraft 10a using the acceleration detected by the acceleration sensor included in detector 81, for example.

In this case, controller 41 can decrease the velocity of aircraft 10a by decreasing the rotational speed of at least one rotor unit 30.

Examples of "when the velocity is not normal" include the case where a difference between the detected velocity of aircraft 10a and the velocity which should originally be according to an instruction from the radio remote control is greater than or equal to a threshold, and the case where the detected velocity of aircraft 10a falls outside a predetermined range. Thus, either of detector 81 and controller 41 may determine whether the velocity of aircraft 10a is normal.

Specifically, for example, the case where the velocity of aircraft 10a is substantially zero when aircraft 10a should originally be moving at a predetermined velocity according to an instruction from the radio remote control is also an example "when velocity is not normal". This state may occur due to, for example, aircraft 10a being caught in a certain obstacle or being held by a person, as well as "the case where acceleration is not normal". Thus, in this case, advantageous effects such as inhibition of decrease in power in battery 42, and reduction of a possibility that rotating propeller 32 interferes an obstacle or a person which is the cause of abnormality can be achieved by decreasing the rotational speed of one or more rotor units 30.

As described above, controller 41 decreases the rotational speed of propeller 32 in at least one rotor unit 30 in aircraft 10a according to the variation, if the result of detection by detector 81 indicates that at least one of the orientation, velocity, and acceleration of aircraft 10a is abnormal.

Accordingly, inhibition of energy consumption and improvement in the safety of aircraft 10, for instance, are achieved when aircraft 10 is not flying normally.

Note that controller 41 may reverse the rotational direction of at least one rotor unit 30. For example, when abnormal inclination is detected as illustrated in FIG. 12A, in order to immediately horizontalize aircraft 10a, controller 41 may rotate propeller 32 in rotor unit 30a in the ascending direction and may rotate propeller 32 in rotor unit 30c in the descending direction. When abnormal acceleration is detected in the ascending direction in which aircraft 10a ascends as illustrated in FIG. 12B, controller 41 may rotate propellers 32 in rotor units 30a to 30d in the descending direction, in order to immediately decrease the acceleration of aircraft 10a.

Specifically, in aircraft 10a, when controller 41 decreases the rotational speed of propeller 32 in at least one rotor unit 30 among rotor units 30, according to the result of detection by detector 81, controller 41 may reversely rotate propeller(s) 32 in one or more rotor units 30 among rotor units 30.

Accordingly, for example, when abnormalities occur in the orientation of aircraft 10a as in this variation, the abnormalities can be eliminated immediately.

Variation 2

Figure 13:
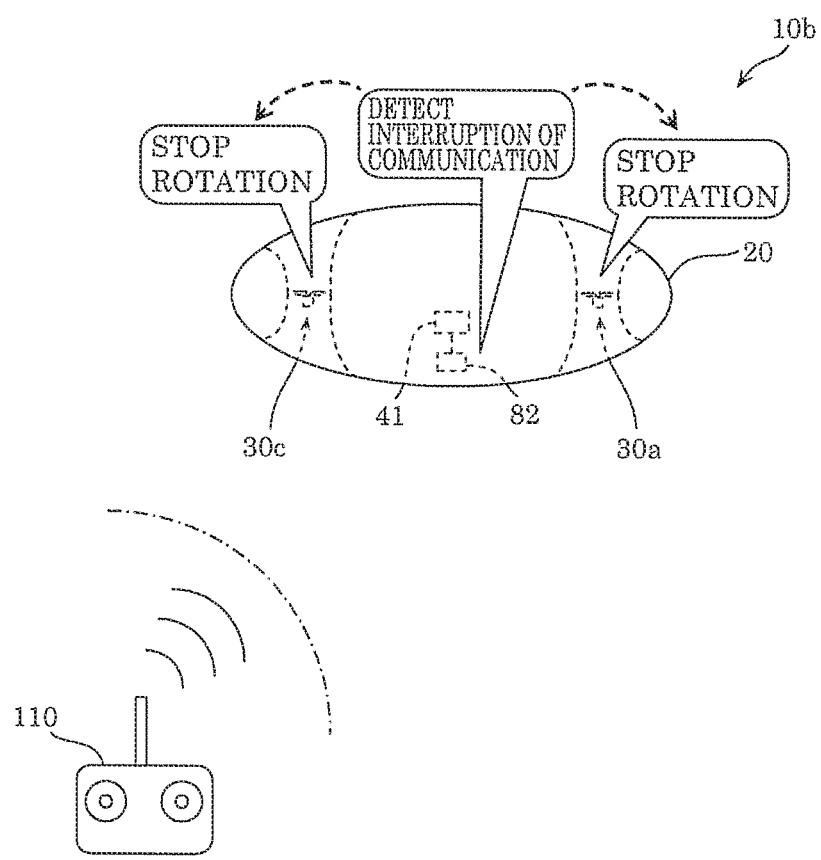
FIG. 13 illustrates an example of controlling operation of an aircraft, according to Variation 2 of the embodiment.

FIG. 13 illustrates an example of controlling operation of aircraft 10b according to Variation 2 of the embodiment.

In this variation, controller 41 included in aircraft 10b receives an instruction signal transmitted from radio remote control 110, and controls operation of rotor units 30, for instance, according to the received instruction signal.

Aircraft 10b includes detector 82 as illustrated in FIG. 13. Detector 82 has a function for monitoring communication. For example, detector 82 detects reception intensity of a radio wave in a communication module included in controller 41, and when the detected reception intensity reaches a predetermined value or less, detector 82 outputs a detection result which indicates that wireless communication has been interrupted. Alternatively, detector 82 outputs the detection result which indicates that wireless communication is interrupted if the state where controller 41 does not receive an instruction signal lasts for a predetermined period, for example.

When the result of detection y detector 82 indicates that wireless communication has been interrupted, controller 41 decreases the rotational speed of propeller 32 in at least one rotor unit 30.

Specifically, when remote control of aircraft 10b becomes impossible due to aircraft 10b being carried away by a strong wind, controller 41 controls rotor units 30 to decrease thrust generated by rotor units 30. Accordingly, for example, aircraft 10b is prevented from flying far away in an uncontrollable state.

Note that controller 41 may further reverse the direction of rotation of at least one rotor unit 30. For example, if interruption of communication is detected as illustrated in FIG. 13, propellers 32 in rotor units 30a to 30d may be rotated in the descending direction in order to prevent aircraft 10b from flying far away in an uncontrollable state.

Aircraft 10b descends by losing at least a portion of buoyancy obtained by rotor units 30, yet as mentioned above, balloon 20 which functions as a shock absorber is included, and thus safety of aircraft 10b or an object present at a location where aircraft 10b descends can be secured. Aircraft 10 gradually descends owing to buoyancy of balloon 20, which also contributes to securing safety.

Controller 41 may have a function as detector 82 which monitors wireless communication. In this case, for example, the function of detector 82 may be achieved by, for instance, a CPU included in and a program stored in controller 41.

Other Embodiments

The above has described the embodiments as examples of technology disclosed in the present application. However, technology according to the present disclosure is not limited to this, and is also applicable to embodiments on which change, replacement, addition, and omission, for instance, is appropriately performed.

For example, after decreasing the rotational speed of propeller 32 in at least one rotor unit 30, controller 41 included in aircraft 10 may increase the rotational speed according to the result of detection by detector 80.

For example, when the result of detection by detector 80 indicates contact with an object, controller 41 decreases the rotational speed of propellers 32 in rotor units 30, and when the result of detection by detector 80 obtained thereafter does not indicate contact with an object, controller 41 may return the rotational speed to a value before the rotational speed is decreased.

For example, in aircraft 10a according to Variation 1 above, when the result of detection by detector 81 indicates that the orientation of aircraft 10a is not normal, controller 41 decreases the rotational speed of propellers 32 in rotor units 30. When the result of detection by detector 81 obtained thereafter indicates that the orientation of aircraft 10a is normal, controller 41 in aircraft 10a may further return the rotational speed to the value before the rotational speed is decreased.

Specifically, controller 41 in aircraft 10 may restore the rotational speed of rotor units 30 once decreased according to the state of aircraft 10, according to the subsequent state of aircraft 10. Such restoring patterns conceivably include changing the rotational speed to a preset value and changing the rotational speed to a value according to the instruction signal received at that time, other than returning the rotational speed of rotor units 30 to the value before the rotational speed is decreased. This also applies to aircrafts 10a and 10b according to Variations 1 and 2 above.

Accordingly, aircraft 10 (10a, 10b) having reduced buoyancy (thrust generated by rotor units 30) since the state has become unstable due to contact with an object or a gust can be automatically returned to a normal state.

Detector 80 which detects contact with an object may include a sensor of a type other than a pressure-sensitive sensor. For example, detector 80 may include one or more strain gauges, and detect contact with an object by detecting a change in electric resistance in any of the strain gauges.

The positions and shapes of areas for disposing detector 80 (sensors 80a to 80d) are not limited to those illustrated in FIG. 2B. For example, pressure-sensitive sensors or strain gages, for instance, included in detector 80 may be disposed discretely on the entire region of a lower surface of balloon 20 or on the entire region of a surface of balloon 20 exposed to the outside. Accordingly, contact of an object with aircraft 10 can be more reliably detected.

Aircraft 10 includes an illumination device such as LEDs, and when detector 80 detects abnormalities regarding the state of aircraft 10, controller 41 may turn on the illumination device so as to notify a manipulator of the abnormalities. Accordingly, the manipulator can visually check the state of aircraft 10.

For example, detector 80 included in aircraft 10 may have a function for detecting both contact with and proximity to an object. Detector 80 may further have at least one detection function among functions for detecting acceleration, velocity, and orientation that detector 81 according to Variation 1 above has and a function for detecting interruption of wireless communication that detector 82 according to Variation 2 above has. Specifically, detector 80 may have a plurality of types of sensors or measuring instruments, in order to detect various abnormalities regarding the state of aircraft 10. Accordingly, controller 41 included in aircraft 10 can control one or more rotor units 30, to handle various abnormalities which may occur during the flight of aircraft 10, for example. This contributes to further improvement in safety of aircraft 10.

In the above embodiments, the number of rotor units 30 included in aircraft 10 is 4, yet the number of rotor units 30 included in aircraft 10 is not limited to 4. The aircraft may include a plurality of rotor units. In addition, the balloon may include a plurality of ventilation holes in each of which one of the rotor units is disposed. For example, if the aircraft includes N rotor units (N is an integer greater than or equal to 2), the balloon may have N or more ventilation holes.

In the above embodiment, the upper end of connector 25 of aircraft 10 is closed, but may be open to the outside. Accordingly, the upper end and the lower end of the space inside connector 25 are open to the outside, and thus a gas in the space inside connector 25 can be readily caused to flow. Accordingly, a mounted device disposed in the space inside connector 25 can be efficiently cooled. Note that in this case, if a configuration is adopted in which a gas is caused to further readily flow by providing a plurality of through holes or notches in disk 40, a gas in the space inside connector 25 can be caused to more readily flow, and thus a mounted device can be more effectively cooled.

For example, in aircraft 10 according to the above embodiment, rotor units 30 may be each removable from balloon 20. Accordingly, for example, when aircraft 10 is carried, rotor units 30 can be removed from balloon 20, and balloon 20 can be folded up small. As a result, the size of packed aircraft 10 when carried can be reduced.

Ventilation holes 22 the number of which is greater than the number of rotor units 30 may be formed in balloon 20. In this case, there is at least one ventilation hole 22 in which rotor unit 30 is not disposed. If such ventilation hole 22 in which rotor unit 30 is not disposed is provided in balloon 20, when aircraft 10 ascends and descends, air resistance which works on aircraft 10 can be reduced.

A protection net which overlies ventilation hole 22 of balloon 20 may be provided for each ventilation hole 22. In this case, protection nets are disposed for each ventilation hole 22 above and below rotor unit 30. The protection nets prevent, for example, foreign matters from entering ventilation holes 22, and accordingly, this reduces a possibility that propellers 32 in rotor units 30 contact foreign matters.

Note that the aircraft which includes the protection nets may have a configuration in which the ventilation holes included in the aircraft have a height which does not allow the protection nets to touch the rotor units even if the balloon and a protection net deform due to contact with an object. Accordingly, even if an object contacts a protection net, the object is inhibited from contacting a rotor unit.

For example, contact of an object with a protection can be detected, or in other words, an object present in a position very close to rotor unit 30 can be detected, by disposing distortion sensors included in detector 80 on the protection nets.

As described above, the embodiments are described as an example of technology according to the present disclosure. The accompanying drawings and a detailed description are provided therefor.

Thus, the elements illustrated in the accompanying drawings and described in the detailed description may include not only elements necessary for addressing the problem, but also elements not necessarily required for addressing the problem, in order to illustrate the above technology. Accordingly, a fact that such unnecessarily required elements are illustrated in the accompanying drawings and described in the detailed description should not immediately lead to a determination that such unnecessarily required elements are required.

In addition, the embodiments described above are intended to illustrate the technology according to the present disclosure, and thus various changes, replacement, addition, and omission, for instance, can be performed within the scope of claims and equivalent thereof.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful for an aircraft which includes a plurality of rotor units and a shock absorber.

What is claimed is:

1. An aircraft, comprising:
    a plurality of rotor units each of which includes a propeller and a motor which drives the propeller, and generates thrust for flight of the aircraft;
    a controller which controls rotation of the propellers included in the plurality of rotor units;
    a shock absorber which laterally covers the plurality of rotor units; and
    a detector which detects a state of the aircraft, wherein
    the controller decreases a rotational speed of the propeller included in at least one rotor unit among the plurality of rotor units, according to a result of detection by the detector,
    the shock absorber includes a plurality of ventilation holes which bass through the shock absorber in an up-and-down direction, and
    the plurality of rotor units are each disposed in a different one of the plurality of ventilation holes.

2. The aircraft according to claim 1, wherein the shock absorber laterally covers the plurality of rotor units, across a height of the plurality of rotor units in an up-and-down direction.

3. The aircraft according to claim 1, wherein the shock absorber is a balloon containing a gas less dense than air.

4. The aircraft according to claim 1, wherein when the result of detection by the detector indicates proximity to or contact with an object, the controller decreases a rotational speed of the propeller in at least one rotor unit closest to the object among the plurality of rotor units.

5. The aircraft according to claim 4, wherein when the result of detection by the detector indicates proximity to or contact with an object, the controller increases a rotational speed of the propeller included in each of one or more rotor units different from the at least one rotor unit closest to the object, among the plurality of rotor units.

6. The aircraft according to claim 1, wherein the controller decreases the rotational speed of the propeller included in the at least one rotor unit when the result of detection by the detector indicates that at least one of an orientation, velocity, and acceleration of the aircraft is abnormal.

7. The aircraft according to claim 1, wherein
    the controller controls rotation of the propellers included in the plurality of rotor units, according to an instruction signal transmitted by a radio remote control through wireless communication, and
    the controller decreases the rotational speed of the propeller included in the at least one rotor unit when the result of detection by the detector indicates interruption of the wireless communication.

8. The aircraft according to claim 1, wherein the controller decreases the rotational speed of the propeller included in the at least one rotor unit to zero, according to the result of detection by the detector.

9. The aircraft according to claim 1, wherein the controller decreases rotational speeds of the propellers included in all the plurality of rotor units, according to the result of detection by the detector.

10. The aircraft according to claim 1, wherein when the controller decreases the rotational speed of the propeller included in the at least one rotor unit among the plurality of rotor units, according to the result of detection by the detector, the controller reversely rotates one or more of the propellers included in one or more rotor units different from the at least one rotor unit, among the plurality of rotor units.

* * * * *